Fig. I

INVENTOR.
JOSEPH W. MARKEY

United States Patent Office 3,702,885
Patented Nov. 14, 1972

3,702,885
PHOSPHORIC ACID PROCESS
Joseph W. Markey, Rumson, N.J., assignor to Cities
Service Company, New York, N.Y.
Continuation-in-part of applications Ser. No. 748,966,
Ser. No. 748,967, Ser. No. 748,996, Ser. No. 749,175,
Ser. No. 749,176, Ser. No. 749,194, and Ser. No.
749,218, all July 31, 1968, all now abandoned. This
application July 13, 1970, Ser. No. 54,330
Int. Cl. C01b 25/18
U.S. Cl. 423—319
29 Claims

ABSTRACT OF THE DISCLOSURE

A mixture of nitric and phosphoric acids can be separated by contact with nitric oxide, the nitric acid and nitric oxide reacting to form nitrogen dioxide gas and water. The nitric oxide can be obtained by decomposing calcium nitrate which, in turn, can be obtained by precipitation from the acidulation solution formed by digesting phosphate rock with nitric acid. The foregoing can be combined in a process wherein phosphate rock is treated with nitric acid to form an acidulate solution, calcium nitrate is precipitated therefrom and decomposed; the nitric oxide in the decomposition gases being recycled to reduce the nitric acid concentration of the acidulate, the nitrogen dioxide in the decomposition gases being recycled to form additional nitric acid.

CROSS REFERENCE TO RELATED APPLICATIONS

Figure 1:
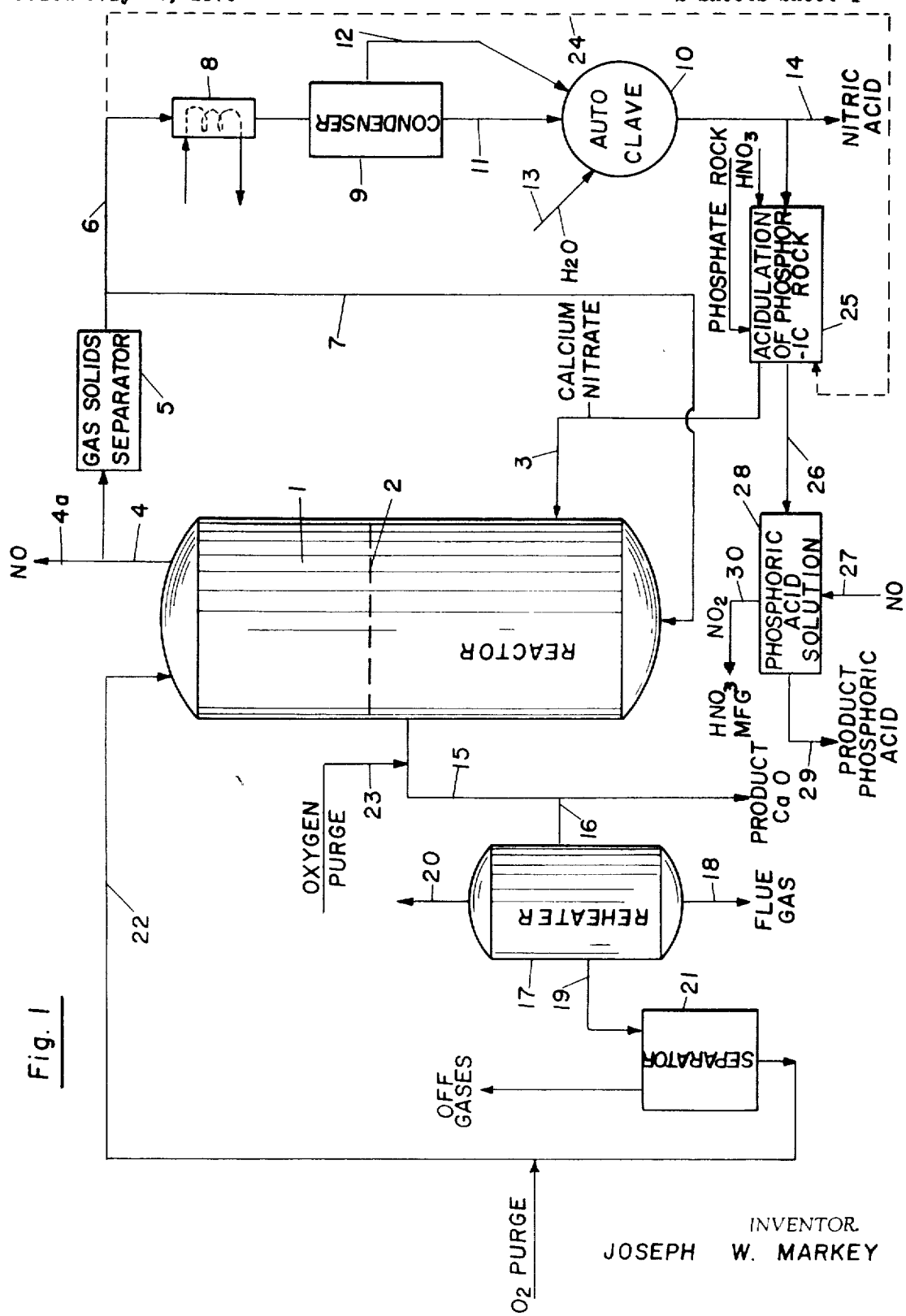

This application is a continuation-in-part of applicant's following applications, all filed July 31, 1968, now abandoned:

| Ser. No.— | Title |
|---|---|
| 748,966 | "Separation of Nitric and Phosphoric Acids." |
| 748,967 | "Phosphoric Acid Production." |
| 748,996 | "Improved Process for Producing Phosphoric Acid." |
| 749,175 | "Production of Phosphoric Acid." |
| 749,176 | "Improved Phosphoric Acid Process." |
| 749,194 | "Improved Nitric Acid Acidulation Process." |
| 749,218 | "Nitric Acid Acidulation of Phosphate Rock." |

BACKGROUND OF THE INVENTION

This invention relates to a process for separating acids from a mixture thereof. More particularly it relates to the separation of nitric acid from a mixture of nitric acid and phosphoric acid. In another aspect, this invention relates to a process for the production of phosphoric acid by the nitric acid acidulation of phosphate rock. In one embodiment of this aspect of the invention, phosphate rock can be digested with nitric acid to form an acidulate comprising phosphoric acid, calcium nitrate and nitric acid, the calcium nitrate can be separated, recovered and decomposed, the decomposition gases can be recycled, the nitric acid content of the acidulate solution can be reduced and a phosphoric acid solution recovered.

Many techniques have been considered for the production of phosphoric acid or a phosphatic concentrate from phosphate rock. Most notable among such techniques is the so-called Wet Process employing sulfuric acid to digest the rock. This technique is the most widely used in industry to date. A process involving the use of nitric acid for acidulation has also been investigated and is used to a limited extent commercially. Recently the demand for sulfur has far exceeded the dwindling supplies so that other methods such as the nitric acid method are of increasing importance. Thus, it is desirable to achieve a process, not involving sulfuric acid, that will be as economical and also overcome some of its inherent disadvantages.

As is well known, the production of phosphoric acid is highly desirable to the fertilizer industry since it is readily utilizable, by neutralization with various bases, to produce mixed fertilizers of high plant food analysis. Even with the long-standing experience of the commercial sulfuric acid and nitric acid processes, deficiencies still exist and it is highly desirable to be able to more efficiently produce a phosphoric acid solution which will more readily form fertilizing materials exhibiting greater water solubility and plant food analysis than heretofore obtainable by practical means.

Previous attempts at processing phosphate rock with nitric acid have left much to be desired in meeting the requirements of the fertilizer industry. By way of specific but illustrative example, the prior nitric acid acidulation processes have involved digesting phosphate rock with low concentrations of nitric acid which, while producing marketable yields of phosphoric acid solution, still leave excessive calcium in the system and require uneconomical processing equipment and techniques. Further, previously known processes have resulted in excessive quantities of water-insoluble calcium phosphates, thereby decreasing the yield of phosphoric acid or usable phosphorous values for fertilizer purposes. Additionally, previous processes have produced calcium nitrate by-product in the less desirable hydrated form. The prior art has used various means for removing the calcium nitrate from the acidulate such as refrigeration or the addition of various salts. However, no practical and economical method for removing adequate quantities of the calcium nitrate from the system has been found producing a phosphoric acid solution which, upon neutralization, results in a highly water soluble fertilizer.

Various efforts have been made to accomplish the thermal decomposition of calcium nitrate to form lime and nitrogen oxides that can be converted into additional nitric acid. The nitric acid formed in this manner can be recycled for the acidulation of additional phosphate rock. Large quantities of energy, however, are required for the decomposition of calcium nitrate. In addition, the calcium nitrate is introduced, either as a solid or as a concentrated solution, into a rotary kiln containing a bed of residual lime, i.e. CaO, formed by recycling the by-product lime produced in the thermal decomposition of the calcium nitrate.

During thermal decomposition, three interfering phases exist in the kiln. The solid phase comprises calcium nitrate and the lime resulting from decomposition of a portion of the calcium nitrate. During decomposition, a gas phase including nitrogen oxides, such as NO and $NO_2$, is formed. The liquid phase comprising calcium nitrate melt is caused by a phase change or melting that occurs below the decomposition temperature.

The by-product calcium nitrate separated from the acidulate is commonly obtained in the form of calcium nitrate tetrahydrate, although a lower hydrate may be produced depending upon the operating conditions employed. Because of the presence of a liquid phase resulting from the melt of calcium nitrate prior to decomposition, stickiness and agglomeration of the calcium solids results. In addition, the liquid phase resulting from the melt of calcium nitrate tends to trap CaO solids that cake onto the walls of the kiln. This prevents or reduces proper heat exchange and also hinders the evolution of nitrogen oxides. In order to overcome this problem, it has been heretofore necessary to maintain from about 60% to about 90% by weight CaO in the mixture of CaO and calcium nitrate in the kiln. This is accomplished by recycling residual CaO from the kiln discharge back into the kiln feed. By maintaining this high proportion of lime in the kiln, it is possible to reduce the stickiness of the material and resultant caking on the walls of the kiln, thereby achieving better solids and gas flow through the kiln. The very high ratio of lime to calcium nitrate, however, results in a significant decrease in the actual available capacity of the kiln.

Accordingly, there exists an urgent need for a simple, direct and economical method for processing phosphate rock into a phosphatic concentrate capable of forming a highly water soluble fertilizer upon further processing, free of the side effects and deficiencies of the prior art.

In the nitric acid acidulation of phosphate rock, an acidulation mixture comprising product phosphoric acid, by-product calcium nitrate, and excess nitric acid is obtained. Various methods are known in the art for separating calcium nitrate from the acidulation mixture, thus leaving essentially a mixture of phosphoric acid and nitric acid.

In the well known "Odda" process, an excess of nitric acid over that theoretically equivalent to the calcium in tthe rock as calcium nitrate is used to digest the phosphate rock. The acidulate is then chilled to crystallize calcium nitrate tetrahydrate. After removal of the tetrahydrate, the remaining acidulate solution is normally ammoniated to produce a solid fertilizer material containing calcium and ammonium phosphates. Ammonium nitrate is also formed due to the presence of the excess nitric acid in the acidulate. The presence of ammonium nitrate, however, tends to make the phosphate products hygroscopic. It is generally necessary to coat the individual particles with a clay or some other material so as to prevent caking during storage and handling. The presence of the ammonium nitrates in the mixed fertilizer material has the added disadvantage of limiting the ratio of $P_2O_5$ to nitrogen that can be obtained in the product mixed fertilizer compositions.

It is highly desirable, therefore, that residual nitric acid be removed from the phosphate rock acidulate not only when phosphoric acid itself is to be recovered, but also prior to ammoniation of the phosphate rock acidulate to produce ammonium phosphates. A separation of the excess nitric acid from the product phosphoric acid may be accomplished by simple boiling. This technique is not satisfactory in commercial operations, however, because of the excessive amount of heat required due to vapor pressure relationships. In addition, the presence of residual calcium in the acidulate tends to cause the fouling of heat transfer surfaces.

Because of the difficulties associated with the removal of nitric acid from admixture with phosphoric acid by simple boiling, other means for accomplishing this operation have heretofore been proposed. For example, surfuric acid has been employed, after calcium nitrate tetrahydrate removal, to precipitate the balance of the calcium as gypsum. Upon removal of the gypsum, the acidulate is subjected to fractionation in a column under high vacuum to remove nitric acid from the acidulate. In order to obtain a low residual nitric acid content, it is necessary to concentrate the phosphoric acid nearly to the range of superphosphoric acid, a concentration not normally required for the bulk of ordinary phosphatic fertilizer production.

The use of the barium ion to remove the nitric acid has also been proposed. Following removal of calcium nitrate, the barium ion is added, and additional refrigeration is employed to crystallize barium nitrate. The barium nitrate is then reacted with ammonia and carbon dioxide to produce barium carbonate and by-product ammonium nitrate. While this process may be employed for the removal of nitric acid from the acidulate, it is disadvantageous, from a practical viewpoint, in view of the costly nature of the process.

SUMMARY OF THE INVENTION

A mixture of nitric and phosphoric acids, in accordance with the present invention, is contacted with nitric oxide. The nitric oxide reacts with the nitric acid content of the mixture to form nitrogen dioxide gas and water. The nitrogen dioxide gas may be removed from the phosphoric acid-containing solution, so as to produce a phosphoric acid solution having a greatly reduced nitrate concentration. The nitrogen dioxide stream separated from the acidulate may be employed for the production of additional quantities of nitric acid in accordance with known techniques. The nitric oxide employed in the practice of the present invention is commonly obtained in the form of a gas stream comprising nitric oxide and oxygen. In this circumstance, the temperature of the gas stream may conviently be within the range of from about 25° C. to about 500° C. The temperatures above about 500° C. are generally to be avoided in order to prevent the reaction of the nitric oxide with oxygen to form nitrogen dioxide. When the nitric oxide is formed at a higher temperature than about 500° C. and is recovered as a gas stream comprising nitric oxide and oxygen, this gas stream is advantageously quenched rapidly to a temperature below about 500° C. so as to preclude the undesired reaction of the nitric oxide with oxygen. Quenching to a temperature of from about 300° C. to about 500° C. in about three seconds or less is quite suitable for this purpose.

The present invention is particularly suitable for removing nitric acid from phosphoric acid following the acidulation of phosphate rock with nitric acid and the removal of by-product calcium nitrate from the acidulation mixture. The present invention may, however, be employed in any other suitable application in which a mixture of nitric and phosphoric acids are to be separated. The concentration of phosphoric acid in the mixture tube separated will ordinarily be within the range of from about 25% to about 98% by weight of the solution containing the mixture. The nitric acid concentration will ordinarily be within the range of from about 1% to about 50% by weight of the solution. When the nitric acid concentration is greater than about 5%, however, it may be convenient to evaporate the solution down to a nitric acid concentration of about 5% by weight prior to the addition of nitric oxide. Thus preliminary concentration may be accomplished by an ordinary evaporation technique or by means of a vacuum concentration operation. Evaporation below about 5% by weight nitric acid becomes undesirable from an operating viewpoint and further reduction in the nitric acid concentration is accomplished by contact of the acid solution with nitric oxide.

The solution of nitric and phosphoric acids can be obtained in several ways. Thus, phosphate rock may be acidulated with nitric acid according to the well-known Odda process and several variations thereof. These processes provide for the nitric acid acidulation of phosphate rock and crystallization and separation of the calcium nitrate formed during the acidulation. In a preferred embodiment however, the solution of nitric and phosphoric acids is obtained by digesting phosphate rock with at least sufficient 75 to 85% by weight concentrated nitric acid to convert the phosphate rock to an acidulate comprising phosphoric acid and calcium nitrate, in solution, and thereafter precipitating anhydrous calcium nitrate from the acidulate.

During the digestion, it is particularly advantageous to employ about an 80% by weight nitric acid concentration. The temperature of the digestion reaction is preferably the equilibrium temperature normally achieved by the reaction of the nitric acid with the phosphate rock. For best results, the rock should be pre-crushed to a particle size so that it will pass through a 30 Tyler mesh screen.

Subsequent to digesting the phosphate rock as aforedescribed, the calcium nitrate is precipitated from the resulting acidulate. In a preferred embodiment, the calcium nitrate is precipitated in its anhydrous form. This precipitation step is best, and preferably, performed by increasing the nitric acid content of the acidulate. The increase in the nitric acid content of the acidulate can be achieved either by adding a more concentrated nitric acid solution to the acidulate or, preferably, by forming nitric acid in situ, for example by introducing a nitrogen oxide and oxygen into the resulting acidulate, preferably under pressure. During the precipitation step, the temperature employed is preferably that achieved by the precipitation reaction mix.

The increase in nitric acid concentration should also be such that, upon precipitation of the calcium nitrate, no more than about 14% by weight of water remains in the resulting supernatant solution.

The supernatant liquid is recovered by conventional means. If desired, the phosphoric acid can be recovered from the supernatant liquid as superphosphoric acid or the supernatant liquid can be employed, if necessary after removal of undesired excess nitric acid, to directly produce mixed fertilizers of high water solubility and high plant food analysis by conventional means.

By the unique process described herein, many advantageous results are achieved. By way of example, a phosphoric acid solution (phosphatic concentrate) is produced which, when converted to a fertilizer mix, is at least 90% and generally at least 95% soluble in water, a feature which has not been readily achievable by the prior art processes. Another feature of the invention is that both steps can be conducted at equilibrium temperature conditions, thus simplifying the economics and obviating the need for complex equipment and processing employed heretofore. For example, there is no need to employ refrigerating equipment or the addition of salts or the like such as used in other nitric acid acidulation processes. Another advantage is that, rather than having to employ high grade phosphate rock as presently required, low grade phosphate rock can be employed while still producing a product from which a high analysis mixed fertilizer having a greater water solubility can be produced. Still further, complications normally attendant by gangue formation in the prior art process are minimized and in many cases obviated. An even further advantage of the invention is that anhydrous calcium nitrate is produced and recovered rather than the hydrated calcium nitrate as is produced by the prior art techniques. The anhydrous calcium nitrate produced by the present invention is of such a high yield, readily at least 90% and most generally over 95%, and of such a high purity that it can be used as obtained; for example, for low quality fertilizer purposes, for decomposition to produce nitrogen oxides which are, in turn, useful for production of nitric acid, or other well known uses of calcium nitrate. These and other advantages of the novel process will be apparent as the discussion proceeds.

The calcium nitrate can be decomposed. The nitrogen values obtained thereby are withdrawn from the decomposition zone principally in the form of nitric oxide and nitrogen dioxide. A portion of the product gas stream may be recycled to provide the fluidizing gas in the case where a fluidized bed decomposition zone is employed. The remainder of the product stream may be absorbed in water to form nitric acid.

The nitric acid produced from the product gases of the present invention may be recycled for acidulation of phosphate rock. In another embodiment, the nitrogen oxides and oxygen in the product gas stream may be added directly to the acidulate to form nitric acid in situ. The present invention, therefore, provides a convenient and efficient means for recovering and utilizing the nitrogen values in the calcium nitrate formed in the nitric acid acidulation of phosphate rock.

As indicated above, the acidulation mixture of nitric and phosphoric acids is contacted with nitric oxide, the nitric acid and nitric oxide reacting to form nitrogen dioxide gas and water. The nitric oxide can conveniently be obtained from the decomposition of calcium nitrate, often in admixture with oxygen.

The calcium nitrate can be decomposed in a fluidized bed decomposition zone. Preferably, the calcium nitrate is decomposed in a nitrogen oxide-rich atmosphere. The nitrogen values of the calcium nitrate, which are produced in the form of nitrogen oxides, can thus be recovered in a product gas stream containing a relatively high proportion of nitrogen oxides. Conversely, the product gas stream will contain a very low percentage of inert material. By also maintaining the ratio of water to nitrogen oxides as low as possible, a product gas stream particularly well suited for the production of very concentrated nitric acid is obtained.

The calcium nitrate to be decomposed may be injected into a decomposition zone in either solid or liquid form. In one embodiment, the calcium nitrate is injected in the form of a mist or spray of atomized droplets. As indicated, the calcium nitrate can be decomposed in a fluidized bed decomposition zone. Fluidization may be achieved by recycling a portion of the gaseous product of the decomposition upwardly through the decomposition zone at a bed fluidizing velocity. The heat necessary for decomposition may be supplied by heating the fluidizing gas or the solid particles introduced into the decomposition zone to form and maintain the solids bed.

The solids bed may be maintained by recycling a portion of the by-product lime withdrawn from the bed. The recycled lime may be heated to above the decomposition temperature of the calcium nitrate in a regeneration zone prior to being introduced into the decomposition zone. During their retention in the decomposition zone, the particles of by-product lime tend to grow due to agglomeration and the deposition of newly formed lime on the surface of the existing particles. Thus, the fluidized bed system results in an advantageous growth in the particle size of the lime product. In the decomposition of calcium nitrate under relatively static conditions, as in a rotary kiln, growth is undesired and leads to a buildup of lime in the reactor. Under relatively static conditions, the evolution of gaseous products from the calcium nitrate results in the formation of extremely finely divided calcium oxide particles. The separation of these particles from the decomposition gases constitutes a difficult, but necessary, operation if the product gases are to be used in the manufacture of nitric acid. The larger sized particles of lime formed by means of the fluidized operation of the present invention, on the other hand, permits the obtaining of a product gas stream essentially free of calcium oxide fines.

Continued growth of the recycled lime particles, however, would ultimately result in particles having a particle size too large for satisfactory fluidization. In the heating of the portion of the by-product lime to be recycled, however, a breakdown in particle size results. Consequently, the lime particles recycled to the decomposition zone following heating in the regeneration zone are of a particle size particularly well suited for the fluidization process of the present invention. The nitrogen values from the decomposed calcium nitrate are withdrawn from the decomposition zone principally in the form of nitric oxide and nitrogen dioxide. A portion of the product gas stream may be recycled to provide the fluidizing gas employed in the decomposition zone. The remainder of the product stream may be absorbed in water to form nitric acid. In the production of nitric acid in this manner, fines comprising very small particles of lime must be removed from the product gas stream. Since the separation of the fines from the product gas steam constitutes a difficult operation, it is desirable that the amount of fines carried over in the product gas stream be minimized.

In the fluidized operation of the present invention, it has been found that the particles of lime tend to grow in size during their retention in the decomposition zone. The growth of the particles correspondingly reduces the amount of fines and thus minimizes the quantity of fines in the product gas stream.

When the production of very concentrated nitric acid from the product gas stream is desired, it is preferable that the partial pressure of nitrogen oxides in the product gas stream be held as high as possible and that the ratio of water to nitrogen oxides be as low as possible. The introduction of water or inerts, such as nitrogen, advantageously should be restricted or avoided. For this reason, it is desirable that the calcium nitrate be fed to the decomposition zone either as the anhydrous crystalline solid, as a melt of the anhydrous salt, or as a highly concentrated aqueous solution of the salt. In addition, any water or nitric acid introduced into the decomposition zone requires utilization of additional heat to decompose the nitric acid and to raise the temperature of the water and decomposition products to the decomposition temperature. The cooling requirements upon reconstituting this material as aqueous nitric acid are correspondingly increased.

In the embodiment of the aspect of present invention, in which the portion of the product gas is recycled to the decomposition zone, the introduction of water or inert gases into the system is thus avoided. This embodiment is, therefore, particularly useful when a very concentrated nitric acid is to be produced from the product gas stream.

The solids withdrawn from the decomposition zone may entrap and carry over nitrogen oxide gases produced in the decomposition zone. In order to recover these nitrogen values, the solids withdrawn from the decomposition zone may be purged with a gas that is fed back into the decomposition chamber. While any inert gas may be employed, an oxygen-rich gas serves not only to recover the nitrogen values in question from the by-product solids stream, but also tends to assure that the product gas stream comprises essentially nitric oxide, nitrogen dioxide, and excess oxygen. With this product gas stream, very concentrated nitric acid can readily be produced.

In another aspect of this invention, the precipitated calcium nitrate is decomposed in a carbon dioxide-rich atmosphere. The carbon dioxide in this atmosphere reacts with the lime formed during decomposition to produce calcium carbonate. Since this action has an exothermic heat of reaction, the heat evolved lowers the external heat requirements in order to accomplish the desired decomposition of calcium nitrate at any particular decomposition temperature. That is, less heat input is required to maintain a given decomposition temperature. Alternately, a higher decomposition temperature can be employed with the same external heat input requirements otherwise required for calcium nitrate decomposition at a lower temperature in an essentially carbon dioxide-free atmosphere.

When solid calcium nitrate is decomposed in the presence of a carbon dioxide-containing atmosphere, the problem of stickiness described above is avoided since the calcium nitrate does not form a significant liquid phase prior to or during the decomposition. It is not necessary, therefore, to provide a large recycle stream of solid by-product as is necessary when the decomposition to produce solid by-product lime is accomplished in an essentially carbon dioxide-free atmosphere.

In another embodiment of this invention, the problem of stickiness can be obviated by the essentially complete melting of the calcium nitrate solids, or any hydrates thereof, prior to injection into the decomposition zone. The melt is thereafter injected into the decomposition zone in the form of a mist or spray. The melt spray or mist is mixed in the decomposition zone with a hot gas containing carbon dioxide. The heat that must be supplied for decomposition is reduced by the heat of reaction of the carbon dioxide with the lime formed during calcium nitrate decomposition. In addition, the problems occasioned by the tendency of solids to cake onto the walls of the decomposition zone are substantially overcome by this procedure.

In still another aspect, the nitric oxide stream may be obtained, for example, by a standard ammonia oxidation process in which a mixture of air and ammonia gas is passed over a conventional oxidation catalyst at a temperature usually in the range of about 900–1,000° C. The resultant nitric oxide gas, if handled as hereinafter set forth to prevent its oxidation to nitrogen dioxide, may be contacted directly with the mixture of acids to be separated.

Another convenient source for the necessary nitric oxide gas is the thermal decomposition of calcium nitrate at approximately 650° C. The anhydrous calcium nitrate recovered as indicated above may advantageously be employed for this purpose. The resulting gaseous decomposition products must also be handled so as to prevent the undesired reaction of the nitric oxide gas with oxygen in the decomposition product stream.

As previously indicated, the nitrogen oxides and oxygen resulting from the decomposition of calcium nitrate may be introduced directly into the acidulate formed by the reaction of phosphate rock with nitric acid. Nitric acid is thereby formed in situ. Preferably the water content of the acidulate is reduced to below about 14% by weight.

It will be readily appreciated that the product gases obtained from the decomposition of calcium nitrate may be subjected to conventional absorption to produce nitric acid solutions having strengths reaching above the azeotrope of about 68%. In this embodiment, the presence of nitrogen and steam in the product gas stream removed from the reactor is of less significance than in the production of the very high concentration.

The nitric acid produced by absorption of the decomposition gases can of course be recycled for acidulation of phosphate rock.

DETAILED DESCRIPTION OF THE INVENTION

The present invention may be employed to separate nitric acid from any mixture of nitric and phosphoric acids commonly encountered in commercial operation. In the production of phosphoric acid and phosphatic fertilizer compositions by the nitric acid acidulation of phosphate rock, for example, it is often necessary or desirable to remove the excess nitric acid from the product phosphoric acid solution. The proportions of nitric acid and phosphoric acid in the mixture to be separated are not critical, but will be limited primarily by the practical limitations under which such mixtures of nitric acid and phosphoric acid will exist in ordinary commercial operations.

The concentration of phosphoric acid in the solution containing the mixture to be separated will ordinarily be within the range of from about 25% to about 98% by weight of said solution. The concentration of nitric acid in this solution will ordinarily be within the range of from about 1% to about 50% by weight of the solution. Mixtures in which the concentration of the acids is outside the ranges hereinabove specified may also be treated in accordance with the present invention to produce a phosphoric acid solution having a greatly reduced nitric concentration although such mixtures are not normally encountered in existing commercial operations.

The mixture of nitric and phosphoric acids is contacted, in accordance with the present invention, with nitric oxide. This nitric oxide, which reacts with the nitric acid present in the mixture to form nitrogen dioxide and water, may be either in liquid or gaseous form, although nitric oxide gas is usually more conveniently available for this purpose. The nitric oxide stream may be obtained, from any convenient source or supply of nitric oxide, either in liquid form or as a gas. The nitric oxide and the solution containing the mixture of acids to be separated may be contacted in any convenient manner assuring a thorough contacting of the nitric oxide and the mixture of acids. When nitric oxide gas is employed, for example, a liquid stream containing the nitric and phosphoric acids to be separated may be contacted counter-currently with the gas stream containing nitric oxide.

The nitric oxide can come from any convenient source. One such source is the calcium nitrate, which can be decomposed as discussed herein to yield nitric oxide. Another convenient source of nitric oxide is by oxidation of ammonia.

The reaction of nitric oxide with oxygen to produce nitrogen dioxide, which is undesired for the purposes of this invention, may be minimized by rapidly quenching the nitric oxide stream produced by catalytic ammonia oxidation, calcium nitrate decomposition or equivalent processes. In order to avoid appreciable reaction of the nitric oxide with oxygen, it is necessary to quench the nitric oxide-oxygen stream to below about 500° C., preferably to from about 300° C. to about 500° C. This quenching must ordinarily be accomplished as rapidly as possible, preferably within about 3 seconds or less if the conversion of appreciable quantities of nitric oxide is to be avoided.

Apart from the limitation referred to hereabove with respect to a gas stream comprising nitric oxide and oxygen, the temperature of the nitric oxide upon contact with the solution containing the mixture of acids to be separated is not critical and may vary widely depending upon the particular circumstance in which the nitric oxide is available for the purposes of this invention. The temperature of the nitric oxide will generally be in the range of from about 25° C. to about 500° C. If the nitric oxide is obtained in a gas stream with oxygen at an elevated temperature, as by the catalytic oxidation of ammonia and the decomposition of calcium nitrate mentioned above, the temperature of nitric oxide-containing gas stream will normally be quenched to at least a temperature in the range from about 300° C. to about 500° C. Lower temperatures, can, of course, also be employed with temperatures within the range of from about 25° C. to about 100° C. being convenient in many instances.

The nitric oxide may be contacted with the mixture of acids to be separated at atmospheric pressure although higher pressure may also be employed if desired. Pressure as high as from about 60 to about 120 p.s.i.g. may, for example, conveniently be employed. Since higher pressures tend to favor the undesired formation of nitrogen dioxide if the nitric oxide is in the presence of oxygen, essentially atmospheric pressure will generally be employed. In one embodiment, a nitric oxide-oxygen gas stream formed at an elevated temperature and pressure may be subjected to an expansion cooling in order to quickly quench this mixture to a lower temperature without the formation of appreciable quantities of nitrogen dioxide. It will be appreciated by those skilled in the art that operating conditions, such as temperature, pressure, and concentration of gases, should be balanced in each instance in accordance with known thermodynamic principles so as to minimize the undesired reaction of nitric oxide with any oxygen that may be present in the gas stream.

In another embodiment of this invention, it is sometimes convenient to subject a mixture of nitric and phosphoric acids to a preliminary evaporation operation prior to contacting the mixture with nitric oxide. This preliminary evaporation may be accomplished by ordinary evaporation techniques or by means of a vacuum concentration operation. Nitric acid and water will be evolved in the evaporation operation. A concentrated nitric acid stream may be recovered and recycled, in phosphate rock acidulation operation, for the treatment of additional quantities of rock. The preliminary evaporation operation may be economically advantageous in reducing the nitric acid concentration of the mixture being treated to about 5% by weight. Reducing the concentration below about 5% by such an evaporation operation, however, becomes increasingly difficult and costly from an operating viewpoint. The increasing corrosiveness of the evaporated material further deters continued evaporation of the solution containing the mixture of acids. In this embodiment, reduction of the nitric acid content of the mixture below about 5% by weight would be accomplished by contact with nitric oxide as heretofore set forth. While any mixture may be treated with nitric oxide in order to substantially reduce the nitric acid content, therefore, the use of nitric oxide for this purpose is patricularly advantageous in removing nitric acid that is present in relatively small amounts, as for example from about 1% to about 5% by weight. It is in the removal of nitric acid present in this proportion in the mixture of acids that is particularly difficult and uneconomical to remove by conventional techniques heretofore employed in the art.

In the digestion step it is a preferred embodiment to employ from about 75 to 85% by weight concentrated nitric acid. Digesting with lower concentrations of nitric acid causes more gangue formation owing to less oxidation of organic impurities and also hinders the precipitation of the preferred anhydrous calcium nitrate from the acidulate in the next step to an extent that adequate removal is impractical. Digesting with concentrations of nitric acid higher than about 85% proceeds very slowly, and results in losses of phosphoric acid on the order of at least 9%. For best results, 80 to 85% by weight, more especially about 80% by weight, concentrated nitric acid is employed.

In the digestion step, the temperature of the reaction mix should be from about 160° to 240° F. While temperatures not within this range can be employed, it has been found that below about 160° F., among other disadvantages, the digestion proceeds too slow for practical operation. Beyond about 240° F., no particular advantage in yield of phosphoric acid is obtained. In addition, the resulting corrosive qualities of the system require prohibitive preventive measures. It is particularly preferable to digest the phosphate rock at the equilibrium reaction temperature of the reacting mixture. The equilibrium temperature usually ranges from about 180° F. to 220° F. No heat control is necessary if digestion is carried on at the equilibrium reaction temperature. Further, more organic impurities are oxidized at equilibrium temperatures, than at lower temperatures, so that less foam is evolved during digestion.

Generally, unground or any size phosphate rock may be utilized for digestion, but it is preferred to crush the rock to a size such that it will pass through about a 16 Tyler mesh screen. For best results, it is preferred to crush the rock to a size passing through about a 30 Tyler mesh screen.

While the time of reaction is influenced somewhat by the rock size and temperature, reaction times of one to 2 hours are preferred when operating according to this invention.

At least sufficient nitric acid to convert the phosphate rock to calcium nitrate and phosphoric acid is employed to digest the rock. The amount of nitric acid employed to digest the rock is based on the amount of calcium in the rock. It is preferred to add an excess, over the theoretical, of nitric acid, usually no more than about 15% by weight, and preferably from about 10 to 15%, based on the calcium present, calculated as CaO. If more excess acid is added, no additional benefit is observed in terms of phosphate recovered by the process. When employing a 10 to 15% excess amount of nitric acid, this results in an acidulation ratio of from about 2.5 to 2.6 parts by weight nitric acid per part calcium calculated as CaO.

As previously indicated the calcium nitrate is desirably precipitated from the acidulate obtained as described above in its anhydrous form. The precipitation of calcium nitrate in the anhydrous form is best, and preferably, accomplished by increasing the nitric acid content or concentration of the acidulate. It will be apparent that various means can be employed to increase the nitric acid content of the acidulate, included among which are the addition of a more concentrated solution of nitric acid to the acidulate or the formation of additional nitric acid in situ via the introduction of nitrogen oxides and oxygen into the acidulate.

In that embodiment wherein pre-formed and higher concentration nitric acid is added to the acidulate, the nitric acid should be at least 90% by weight concentrated. It is preferred, however, that the nitric acid be at least 95% and, more especially, at least 98% by weight concentrated (hereinafter referred to as essentially anhydrous nitric acid). Such pre-formed nitric acid is employed in amounts between about 0.5 to about 2.5 parts per part of phosphate rock initially acidulated.

In the alternative, but especially preferred, embodiment, the content of nitric acid in the acidulate is increased by introducing one or more nitrogen oxides (preferably the nitrogen oxides recycled and resulting from decomposition of calcium nitrate by-product) and oxygen, including air, into the acidulate at appropriate conditions to form nitric acid in situ with the water present in the acidulate. The water content is thus reduced in accordance with the equation:

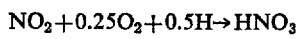

$$NO_2 + 0.25 O_2 + 0.5 H \rightarrow HNO_3$$

In forming the nitric acid in situ, generally, a pressure of between about 100 p.s.i.g. and about 500 p.s.i.g. should be maintained for best results. Additionally, the amount of nitrogen oxides introduced into the acidulate in order to form the desired nitric acid in situ will depend somewhat upon the particular grade of phosphate rock employed and the specific concentration of nitric acid used to digest the rock. For convenience, the amount of nitrogen oxides can be based upon the quantity of rock acidulated. It has been found that generally from between about 0.75 and about 1.20 parts of nitrogen oxides, calculated as $N_2O_5$, per part of phosphate rock initially acidulated will be employed.

In another embodiment of this invention, a phosphoric acid solution may be produced in which most of the metal ions, particularly iron and aluminum, have been removed and recovered. As the water content is reduced and the system approaches an anhydrous condition, the metal ions begin to precipitate as metal phosphates. In order to recover these precipitates for their phosphate value, the bulk of the calcium nitrate can first be removed, and water content of the filtrate can thereafter be reduced, e.g. as by reaction with nitrogen oxides and oxygen, so as to precipitate the metal phosphates. These phosphates, which can then be recovered in the concentrated form, may be employed in the manufacture of triple superphosphate or can be ammoniated to produce a mixed fertilizer composition. A purified phosphoric acid solution, having a low content of metal impurities, can thus be obtained.

Regardless of what mode of operation is employed for increasing the nitric acid content in the acidulate, the temperature employed during the precipitation of the anhydrous calcium nitrate can be varied. It has been found, however, that best results are obtained when the equilibrium temperature of the precipitation mix is employed, e.g. from 160° F. to 190° F.

Further improvement is obtained when the water content of the calcium nitrate precipitation system is such that, after precipitation of the calcium nitrate, no more than 14% water is present in the supernatant solution regardless of whether the nitric acid content is increased by the addition of a more concentrated, pre-formed nitric acid solution or forming nitric acid in situ in the precipitation reaction mix.

Some advantages is achieved by recycling a slurry of anhydrous calcium nitrate obtained from a previous precipitation step into the acidulate obtained from the digestion step in order to provide anhydrous calcium nitrate particles as nuclei for particle growth.

Generally speaking, the precipitation of the anhydrous calcium nitrate is essentially instantaneous. Upon completion of the precipitation, the solid and liquid phases can be separated by conventional means, e.g. decanting, filtration or, preferably, centrifugation. Such separation is readily achieved since the liquid phase is of a low viscosity and the anhydrous calcium nitrate crystals will settle rapidly.

While the precipitation reaction mix can be retained for a considerable period of time prior to separation, it is preferably to perform separation operations within a period of about one to two hours after precipitation.

Subsequent to separation, it is preferred that the anhydrous calcium nitrate cake be washed with between about 75 to 85, more especially about 80, percent by weight concentrated nitric acid, in order to recover any adsorbed phosphorus values. While varying amounts of such nitric acid wash solution can be employed, it is preferred that at least one part per part of anhydrous calcium nitrate be employed. It is likewise desirable to employ such nitric acid wash solution at a temperature of 70° to 100° F. in order to minimize the re-solution of calcium nitrate from the filtrate cake. The wash acid can, of course, be employed in the digestion step if desired.

The supernatant liquid remaining after removal of the precipitated anhydrous calcium nitrate can be employed as such in the usual applications of forming mixed fertilizers. For example, upon removal of nitric acid and/or water, if desired, the supernatant liquid can be reacted with bases, such as ammonia or potassium hydroxide, to produce mixed fertilizers which have an exceptionally high water solubility and plant food analysis. On the other hand, the supernatant phosphoric acid solution can be subjected to purification techniques in order to recover essentially pure phosphoric acid.

In one aspect of the present invention, the calcium nitrate is decomposed in a vertically oriented decomposition zone containing a bed of inert particulate inorganic material maintained in the fluidized state by the passage of an inert gas upwardly through the bed at a spatial velocity sufficient to maintain the bed in a fluidized state. The product gases obtained by the decomposition of the calcium nitrate are withdrawn from the decomposition zone from a point above the fluidized bed. The product gases comprise generally nitrogen oxides. Lime is also produced as a solid by-product of the decomposition reaction. These solids are also withdrawn from the decomposition zone separately from the product gases. The nitrogen values of the calcium nitrate being decomposed are, in this manner, recovered essentially in the form of nitric oxide and nitrogen dioxide.

In another aspect of this invention the precipitated calcium nitrate is decomposed in a nitrogen oxide-containing atmosphere in order to minimize the proportion of inerts included in the resulting product gas stream. By also minimizing or at least restricting the amount of water in the system, a resulting product gas stream may be obtained that is particularly well suited for the production of very concentrated nitric acid. As will hereinafter be set forth in further detail, a variety of techniques may be employed for contacting the calcium nitrate with the nitrogen oxide-containing atmosphere during decomposition.

In the practice of one aspect of the present invention, the precipitated calcium nitrate is decomposed in a vertically oriented decomposition zone containing a bed of inert particulate inorganic material maintained in the fluidized state by the passage of an inert gas upwardly through the bed at a spatial velocity sufficient to maintain the bed in a fluidized state. The product gases obtained by the decomposition of the calcium nitrate are withdrawn from the decomposition zone from a point above the fluidized bed. The product gases comprise generally nitrogen oxides. Lime is also produced as a solid by-product of the decomposition reaction. These solids are also withdrawn from the decomposition zone separately from the product gases. The nitrogen values of the calcium nitrate being decomposed are, in this manner, recovered essentially in the form of nitric oxide and nitrogen dioxide.

The bed of solids employed in the present invention may comprise any suitable inert particulate inorganic material. Illustrative of the various inert solids that may be employed are silica, clay, calcium carbonate, calcium oxide, and mixtures thereof. Since solid calcium oxide is produced in the decomposition of the calcium nitrate, the desired quantity of solids may be maintained in the decomposition zone by continuously withdrawing a portion of the solids separately from the product gases. In another embodiment, a portion of the solids removed from the decomposition zone may, of course, be recycled back to the decomposition zone. This feature has particular advantages as will be pointed out hereinafter in further detail.

The bed of solids is maintained in a fluidized state by passing an inert gas upwardly through the decomposition zone at a spatial velocity sufficient to maintain the bed in a fluidized state. While the spatial velocity will depend upon the fineness and density of the inert solids employed, the velocity will generally range from about 0.5 to about 3.0 feet per second.

Any suitable inert gas may be employed as the fluidizing gas of the present invention. For example, air or oxygen can conveniently be employed. As discussed below, it is often desirable that the product gases contain a very low percentage of inert material, e.g. nitrogen, as a diluent. For this reason, it is often convenient to recycle a portion of the product gas stream comprising nitrogen oxides for further passage upwardly through the decomposition zone as the fluidizing gas. In another embodiment of the present invention, the fluidizing gas may comprise carbon dioxide. In this instance, the fluidizing gas is not inert but tends to react with the by-product lime so as to form calcium carbonate. Since this reaction is exothermic, the overall heat requirements for the decomposition of the calcium nitrate are correspondingly reduced. The by-product calcium carbonate can be removed from the bed and, if desired, a portion thereof may be recycled so as to maintain the desired quantity of solids in the decomposition zone.

It is within the scope of the present invention to inject the calcium nitrate into the decomposition zone in either solid or liquid form. When the product gases are to be employed for the production of very high concentration nitric acid, it is highly advantageous that the partial pressure of nitrogen oxides in the product gas stream be held as high as possible and that the introduction of water into the system be restricted to the extent possible. As previously indicated, the introduction of inerts such as nitrogen can be avoided by recycling a portion of the product gas stream as the fluidizing gas. The calcium nitrate may be fed to the decomposition zone as an anhydrous crystalline solid, as a melt of the anhydrous salt, or as a highly concentrated aqueous solution of the salt. When introduced as the anhydrous crystalline solid, the calcium nitrate may be employed in dry form or in wet form as following washing with a minimum amount of aqueous nitric acid. When the calcium nitrate is introduced as a highly concentrated aqueous solution, the solution may contain some nitric acid.

The calcium nitrate being decomposed should, of course, be heated to at least its decomposition temperature. The decomposition temperature of calcium nitrate is approximately 650° C. at atmospheric pressure. While higher temperatures may be employed in order to hasten the decomposition of the calcium nitrate, it has generally been found that the use of higher temperatures tends to cause some reversion of the nitrogen oxides in the product gas stream to nitrogen. When nitric acid is to be produced from the nitrogen values in the product gas stream, it is desirable that the nitrogen be recovered from the calcium nitrate decomposition operation in the form of nitrogen oxides. The use of temperatures increasingly higher than the decomposition temperature of the calcium nitrate will, for this reason, generally be discouraged. In addition, if the recovery of by-product calcium carbonate is desired in the embodiment in which the fluidizing gas contains carbon dioxide, the temperature should not exceed the decomposition temperature of the calcium carbonate, i.e., about 895° C. The decomposition zone will generally be maintained at a temperature within the range of from about 650° C. to about 675° C. The heat required to maintain the decomposition zone at the required temperature may be supplied in any convenient manner. For example, the solids added to the decomposition zone or the fluidizing gas may be heated to the necessary temperature for maintaining the reactor at decomposition temperature; alternately, the reactor may be externally heated.

The product gas stream withdrawn from the fluidized bed will generally comprise nitrogen oxides. At the operating temperature required to decompose calcium nitrate, the principal nitrogen-bearing gases obtained will be nitric oxide and nitrogen dioxide. The recovery of the nitrogen values from the calcium nitrate in the form of these nitrogen oxides renders the process readily adaptable to a cyclic operation in which nitric acid is employed for the acidulation of phosphate rock. By-product calcium nitrate is decomposed in accordance with the present invention to produce a product gas stream containing nitrogen oxides from which additional nitric acid may readily be obtained. As set forth below, the product gas stream may be used for producing nitric acid having a concentration in a range including the azeotrope of about 68% and may also be employed for the production of very high concentration acids, i.e. 98% or higher. For this purpose, an excess of oxygen over that stoichiometrically required is generally needed for the production of very highly concentrated nitric acid. This excess oxygen can, if desired, be obtained by the use of a fluidizing gas comprising oxygen. Alternately, an oxygen purge countercurrent to the solids withdrawal stream may be employed. In this manner, the nitrogen values that may be entrapped or otherwise carried over into the solids withdrawal stream may be recovered in the form of nitrogen oxides, thus serving also to eliminate nitrogen from the product gases, while likewise adding the excess oxygen that would, in any event, have to be added at some stage in order to produce a very concentrated nitric acid.

In the particular embodiment illustrated in FIG. 1, calcium nitrate is decomposed in a vertically oriented reactor 1 having bed 2. The material to be decomposed is introduced into reactor 1 through line 3, while line 4 is provided for the withdrawal of gases from the upper portion of reactor 1. The product gases pass through line 4 to gas-solids separator 5 and exit line 6. A portion of the gas may be recycled to reactor 1 through line 7. The remaining product gases pass through line 6 and heat exchanger 8 to condensing unit 9. Liquids and gases pass from condensing unit 9 to autoclave 10 through line 11 and 12, respectively. Water may be added to the autoclave through line 13, and nitric acid produced in the autoclave may be withdrawn through line 14.

Solids may be withdrawn from reactor 1 through line 15 positioned below the interface between the fluidized bed and the gas in the upper portion of the reactor. Countercurrent oxygen purge line 23 is provided in order to purge solids withdrawn through line 15 of entrapped nitrogen gases. A portion of the solids withdrawn through line 15 may be passed through line 16 to fluo-solids regenerator 17 in which the solids are heated by combustion gases entering through line 18.

Solids may be withdrawn from regenerator 17 through line 19 while gaseous material is taken off through line 20. After passing through gas-solids separator 21, the solids may be returned to reactor 1 through line 22.

In the operation of the illustrated embodiment, anhydrous calcium nitrate precipitated in the manner indicated above is fed into the fluidized bed decomposition zone of reactor 1 maintained at the decomposition temperature of calcium nitrate. A portion of the product gases recycled through line 7 is injected into the reactor at a sufficient spatial velocity to maintain the bed in a fluidized state. The by-product lime removed from the reactor through line 15 is heated in fluo-solids regenerator 17 and is recycled to the reactor through line 22. Sufficient solids are recycled to supply the heat necessary for decomposition under fluid bed conditions. Since the requirement for recycled solids is one of heat transfer rather than of avoiding stickiness, the amount of recycle employed in the present invention can be considerably less than in the prior art techniques referred to above. The temperature to which the recycle solids is raised in regenerator 17 is, of course, a function of the ratio of calcium nitrate feed to recycle solids at which it is desired to operate. Solids can also be recovered from the regenerator effluent and its heat content may be recovered in a conventional manner prior to discharge of the flue gas.

By purging the solids withdrawal stream with oxygen from line 23, any nitrogen values entrapped or otherwise carried over with the solids may be recovered in the form of nitrogen oxides. Thus, the product gas stream leaving reactor 1 will comprise essentially nitrogen oxides, i.e. nitric oxide and nitrogen dioxide, excess oxygen and a small amount of fines, principally calcium oxide. After passage through gas-solids separator 5, and withdrawal of the portion of the product gas employed for fluidization of bed 2, the product gas stream may be passed through heat exchanger 8 and condensing unit 9 in which, under moderate pressure, the stream may be refrigerated so as to remove essentially all of the nitrogen oxides as liquid nitrogen tetroxide. Gaseous oxygen remains in the gas stream. These streams may then be pumped separately through lines 11 and 12 and compressed into an autoclave 10 into which an appropriate amount of water is added through line 13. Nitric acid is produced in autoclave 10 in accordance with known procedures to produce acid having a concentration of 98% or higher. While this autoclave process must be carried out with an excess of oxygen as well known in the art, the autoclave may be operated at considerably reduced pressure in the absence of diluent such as nitrogen. The use of recycled product gas as the fluidizing gas and the inclusion of the recited oxygen purge are highly advantageous features of this aspect of the present invention. It is within the scope of the present invention to employ the very concentrated nitric acid thus produced in the nitric acid acidulation operation. In one embodiment, the acid is employed at a concentration of about 75% to about 85% by weight, for the digestion of additional quantities of phosphate rock in reaction vessel 25. Alternately, the very concentrated nitric acid may be employed, preferably at a concentration above 90% by weight, or more preferably above 95% by weight, for the precipitation of anhydrous calcium nitrate from the acidulate formed in reaction vessel 25. Product phosphoric acid solution is withdrawn through line 26, whereas separated anhydrous calcium nitrate is recycled to reactor 1 through line 3.

As previously indicated, the nitrogen oxides and oxygen resulting from the decomposition of calcium nitrate may be introduced directly into the acidulate formed by the reaction of phosphate rock with nitric acid having a concentration of about 75% to 85% by weight. Nitric acid is thereby formed in situ, thus reducing the water content of the acidulate generally to below about 14% by weight. In this embodiment, the nitrogen oxides are passed from exit line 6 to line 24 for introduction into the acidulation mixture in reaction vessel 25. Phosphoric acid solution is withdrawn from reaction vessel 25 as product through line 26. The separated anhydrous calcium nitrate is recycled to reactor 1 through line 3.

It will be readily appreciated that the product gases obtained from reactor 1 may be subjected to conventional absorption to produce nitric acid solutions having strengths reaching above the azeotrope of about 68%. In this embodiment, the presence of nitrogen and steam in the product gas stream removed from the reactor is of less significance than in the production of the very high concentration acids as indicated above.

The heat required for decomposition of the calcium nitrate can be furnished by heating the portion of the product gas stream to be recycled to the reactor. However, the low specific heat and specific gravity of the gas would necessitate a relatively high gas recycle to furnish the required amount of heat. In the embodiment illustrated in the drawing, therefore, the heat is supplied by recycling a portion of the lime withdrawn from the reactor. While a fluidized bed regenerator unit 17 was indicated, it is, of course, within the scope of the invention to provide any other convenient means for heating the recycle lime.

It has heretofore been found that, upon decomposition of calcium nitrate, extremely finely divided calcium oxide particles are formed during the evolution of the gaseous products. These fine particles must necessarily be separated from the decomposition gases to be employed for the manufacture of nitric acid. This separation, however, constitutes a different operation that adversely affects the overall process of decomposing calcium nitrate for the ultimate recovery of the nitrogen values as nitric acid.

In the fluidized bed process of the present invention, on the other hand, the particles of lime tend to grow during the calcium nitrate decomposition due to agglomeration and deposition of new lime on the surface of the existing particles. For example, calcium nitrate samples were decomposed in a fluid bed reactor maintained at decomposition temperature in accordance with the present invention. The particle size distribution of the lime during the runs is set forth in Table I as follows:

TABLE I

| Time (min.) | Particle size distribution (mesh) | | | | | Gas velocity (ft./sec.) |
|---|---|---|---|---|---|---|
| | +20 percent | +40 percent | +60 percent | +80 percent | -80 percent | |
| 0 | 0 | 0 | 50 | 100 | | |
| 11.7 | 0.9 | 1.7 | 56.8 | 100 | | 1.76 |
| 17.0 | 4.5 | 12.1 | 71.2 | 100 | | 1.76 |
| 28.4 | 23.5 | 40.9 | 87.1 | 100 | | 3.17 |
| 0 | 5 | 32.5 | 67.5 | 95.0 | 5.0 | |
| 5 | 12.6 | 52.8 | 86.6 | 99.2 | 0.8 | 1.76 |
| 10 | 15.6 | 63.8 | 91.5 | 99.3 | 0.7 | 1.76 |
| 15 | 18.7 | 72.0 | 95.3 | 100.0 | 0.0 | 2.64 |
| 20 | 19.2 | 73.4 | 97.2 | 100.0 | 0.0 | 2.64 |

As demonstrated by the results shown in Table I, a definite tendency for growth of the lime particles in the fluidized bed occurs during calcium nitrate decomposition. This growth and the resultant withdrawal of coarser particles from the decomposition zone tends to minimize the carry-over of fines into the product gas stream. This feature of the present invention is of great significance in view of the difficulty with which such fines are removed from the product gas stream.

As indicated above, one embodiment of the present invention calls for the heating of a portion of the lime withdrawn from the decomposition zone followed by recycling to the bed in the reactor. If the recycle lime were to continue to grow in particle size, the particles would eventually become too large for satisfactory fluidization. When the particles of lime are reheated, however, it has been found that a breakdown in particle size occurs. As a result, the reheated lime has a particle size more appropriate for fluidization than the coarser particles as withdrawn from the decomposition zone. The disintegration of calcium oxide particles on heating is shown in Table II, which indicates the effect of heating on the particle size distribution of the calcium oxide.

TABLE II

| Temp. (° F.) | Size distribution (mesh) | | | | |
|---|---|---|---|---|---|
| | +20 percent | +40 percent | +60 percent | +80 percent | −80 percent |
| 25 | 0.0 | 50.0 | 100.0 | | |
| 1,290 | 0.0 | 38.3 | 56.7 | 95.8 | 4.2 |

It can readily be seen from the results shown in Table II that heating causes a breakdown in particle size of the lime particles so that a finer particle size distribution is obtained. While fines may thus be produced in the regenerating unit, the production of fines at this point is of less consequence than the production of fines in the reactor. The flue gas from the regenerating unit, together with very fine material contained therein, will ordinarily be discarded after heat recovery. In order to avoid air pollution the gas may be passed through a water scrubber. The use of such a scrubber can not be tolerated, however, with respect to the product gas stream from which very highly concentrated nitric acid is to be produced.

In the decomposition of particular samples of calcium nitrate under static conditions, the bulk density of the lime produced was 30 pounds per cubic foot. Lime produced in the fluidized bed decomposition of such calcium nitrate, however, had a density of about 68 to 70 pounds per cubic foot. The density distribution of calcium oxide from the decomposition of calcium nitrate in accordance with the present invention was as set forth in Table III below.

TABLE III.—BULK DENSITY OF CALCIUM OXIDE

| Particle size range (mesh) | | Bulk density, lbs./ft. |
|---|---|---|
| (−) | (+) | |
| | 20 | 68.0 |
| 20 | 40 | 74.2 |
| 40 | 60 | 77.8 |
| 60 | 80 | 62.5 |
| 80 | | 51.8 |

While the degree of agglomeration and particle growth will depend upon such factors as initial particle size distribution and the particular decomposition temperature, the results in Table III further demonstrate that a larger, more stable product is obtained in the fluidized bed decomposition aspect of the process of the present invention. The increase in bulk density for particles of relatively finer particle size is indicative of the agglomeration and formation of higher and larger particles that serves to minimize the production and carry-over of fines in the product gas stream as discussed above. In the regeneration zone, on the other hand, the lime tends to disintegrate under heating. While the degree of disintegration will depend upon such factors as the initial particle size distribution and the desired reheat temperature, the bulk density of the recycled lime, following heating in the regeneration zone, is commonly on the order of about 50 to 55 pounds per cubic foot.

The nitrogen oxide-containing atmosphere employed herein can, of course, be obtained in any convenient manner. Ammonia gas may be burned, for example, to form nitrogen oxides, e.g. nitric oxide and nitrogen dioxide, from which the water of reaction may be condensed and trapped away in a conventional manner. The nitrogen oxides may thereafter be injected into the decomposition zone so as to establish the nitric oxide-containing atmosphere therein.

While the present aspect of the invention has been described herein with respect to nitrogen oxide-containing atmospheres in which the quantity of inerts and water has been minimized, it is also within the scope of the invention to employ a nitrogen oxide-containing atmosphere in which the quantity of inerts and water is not minimized. For example, ammonia gas may be mixed with air, e.g. 11 percent $HN_3$, passed through a fine wire gauze of activated platinum raised to glowing heat, and combined to form nitric oxide, i.e. (NO), and water. At least a portion of the nitric oxide will convert to nitrogen dioxide. The mixed nitrogen oxides, together with the water of reaction, may be injected into the decomposition zone to provide a nitrogen oxide-containing atmosphere during decomposition of calcium nitrate.

As indicated above, the precipitated calcium nitrate may be fed to the decomposition zone as an anhydrous crystalline salt, as a melt of the anhydrous salt, or as a highly concentrated aqueous solution of the salt in those instances in which it is desired to maintain the ratio of water to nitrogen oxides as low as possible. In addition to the fluidized bed decomposition zone described above, various other techniques may be employed for contacting the calcium nitrate and the nitrogen oxide-containing atmosphere during decomposition. Thus, a rotary kiln containing a bed of residual lime may be employed. The bed may be maintained by recycling by-product lime formed during the thermal decomposition of the calcium nitrate. Any other conventional type contacting chamber in which the calcium nitrate may be exposed to decomposition temperature in the presence of a nitrogen oxide-containing atmosphere may be employed in the practice of the present invention. In one embodiment, a nitrogen oxide-containing gas may be fed countercurrently to the calcium nitrate feed so as to assure the thorough contacting of the calcium nitrate with the gas, which may be heated to supply all or a portion of the heat necessary for decomposition. It is also within the scope of the present invention to include carbon dioxide in the nitrogen oxide-containing atmosphere. Since the carbon dioxide tends to react with the by-product lime in an exothermic reaction, the heat requirements for the calcium nitrate decomposition are thus reduced. While the amount of carbon dioxide is not critical, the nitrogen oxide-containing atmosphere may conveniently contain 20% or more by weight $CO_2$ although lesser quantities may be employed.

In another embodiment of the present invention, the calcium nitrate may be injected into the decomposition zone in the form of a mist or spray of atomized droplets. Complete external melting of the calcium nitrate solids, or any hydrates thereof, can be accomplished continuously with any of the standard, commercially available melting furnaces commonly employed for similar purposes. Gas or oil fired units and electric units are commercially available. Injecting the calcium nitrate melt into the decomposition zone can be accomplished in a variety of ways. The melt can, for example, be put under pressure and passed through a venturi ejector in which it is mixed with the heat-carrying nitrogen oxide-containing atmosphere so as to form a mist that is injected into the decomposition zone. Likewise, hot nitrogen oxide-containing gas may be compressed and passed through the nozzle of a venturi type ejector so as to pull the melt from the melting unit by the vacuum induced in the suction end of the venturi, thus mixing the nitrogen oxide-containing gas and the calcium nitrate melt to produce a spray mist that is injected into the decomposition zone. In another embodiment, the melt can be injected directly as atomized droplets into the decomposition zone in which it is mixed with the hot, nitrogen oxide-containing atmosphere to affect decomposition.

Figure 2:
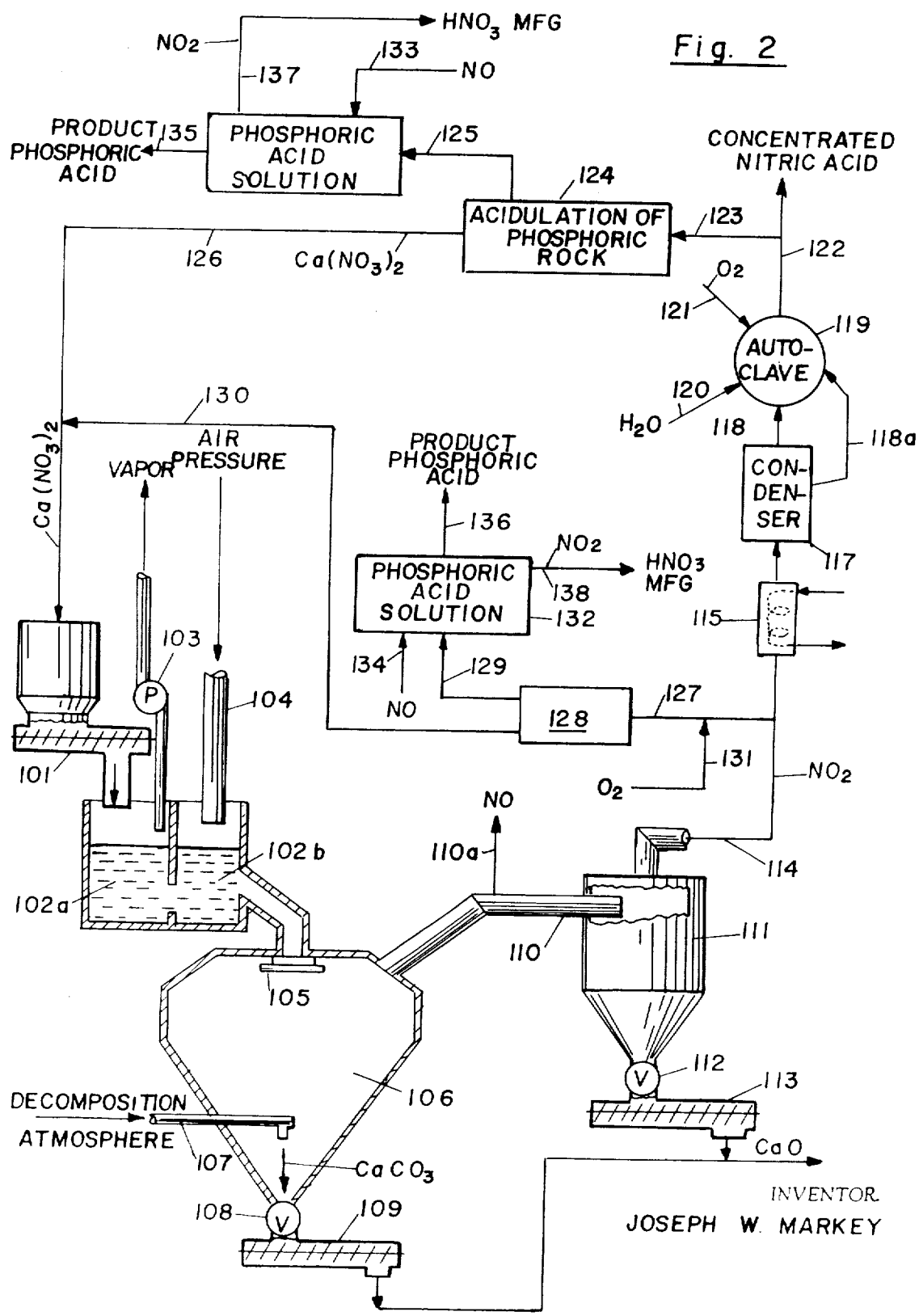

In FIG. 2, calcium nitrate solids are decomposed so as to form nitrogen oxides that can be converted to nitric acid. The calcium nitrate solids being decomposed may be those formed in the nitric acid acidulation of phosphate rock to form wet process phosphoric acid. This acidulation step and the subsequent conventional separation of calcium nitrate from the reaction mixture are not shown in the drawing. The separated calcium nitrate solids are fed to screw conveyor 101 that transports them to the melting section of an electric melter 102 having a separate melting section 102a and holding section 102b. Exhaust fan 103 is provided to remove any vapors formed during the melting section 102a. Pressure exerted by means of compressed air line 104 forces the calcium nitrate melt from holding section 102b to a standard disk atomizer 105 positioned at the upper end of decomposition chamber 106.

A hot nitrogen oxide-containing gas, or other gas whose presence is desired is introduced into the lower portion of decomposition chamber 106 by means of conduit 107. Countercurrent flow of the calcium nitrate melt and the nitrogen oxide-containing gas is thereby achieved in decomposition chamber 106. A portion of the by-product lime collects in the bottom of decomposition chamber 106 and is discharged through air lock valve 108 onto screw conveyor 109, which removes it to storage and ultimate use as a by-product of the acidulation process. The remainder of the lime formed in decomposition chamber 106 is removed as fines in the nitrogen oxide gas stream passing out of decomposition chamber 106 through conduit 110. This product gas stream passes through dust collector 111 in which the fines are removed therefrom and collected. The lime thus removed from the product gas stream is passed through air lock valve 112 onto screw conveyor 113 that discharges that collected lime for storage with the lime recovered from the bottom of decomposition chamber 106.

After leaving dust collector cyclone 111, in which a large portion of the fines are removed therefrom, the product nitrogen oxide gas stream may be passed through conventional electrostatic Cottrell precipitators or a conventional bag house, not shown, for removal of additional fines that may still be present in the gas stream. The gases may then be passed, if desired, to a conventional nitric acid manufacturing unit, not shown, in which the nitrogen oxides are absorbed in water to form nitric acid of from about 52% to about 68% by weight concentration. Alternately, the nitrogen oxide product gas stream may be passed through line 114, heat exchanger 115 and line 116 to condensing unit 117. In this unit, the product gas stream may be refrigerated, under moderate pressure, so as to remove essentially all of the nitrogen oxides as liquid nitrogen tetroxide. Gaseous oxygen remains in the gas stream. These streams may then be pumped separately through lines 118 and 118a and compressed in autoclave 119 in accordance with known procedures to produce and having a very high concentration, as, for example 98% by weight or higher. While this autoclave process must be carried out with an excess of oxygen, as well known in the art, the autoclave may be operated at considerably reduced pressure in the absence of a diluent such as nitrogen. If additional oxygen is required, it may be introduced into the autoclave with the product gas stream, i.e. through line 118a, or through line 121. Water may be added to the autoclave through line 120.

It will be appreciated that the concentrated nitric acid withdrawn from the autoclave through line 122 may be passed through line 123 to the acidulation unit 124. The concentration acid thus formed from the nitrogen oxide gases may be employed, in acidulation unit 124, at a concentration of about 75% to about 85% by weight, for the digestion of phosphate rock. Alternately, this concentrated nitric acid may be employed, preferably, at a concentration above 90% by weight, for the precipitation of anhydrous calcium nitrate from the acidulate. The product phosphoric acid solution is withdrawn through line 125, whereas the precipitated calcium nitrate may be passed through line 126 to the calcium nitrate decomposition zone.

As previously indicated, the nitrogen oxides and oxygen resulting from the decomposition of calcium nitrate may be introduced directly into the acidulate form by the reaction of phosphate rock with nitric acid having a concentration of about 75% to 85% by weight. Nitric acid is thereby formed in situ, thus reducing the water content of the acidulate generally to below about 14% by weight. In this embodiment, the nitrogen oxides and oxygen are passed through lines 114 and 127 directly into the acidulation mixture in reaction unit 128. Additional oxygen may be added, if desired, through line 131. Phosphoric acid solution is withdrawn from reaction unit 128 as product through line 129. The separated anhydrous calcium nitrate is recycled to the decomposition operation through line 130.

In another aspect of the present invention, the precipitated calcium nitrate can be decomposed in an atmosphere containing sufficient carbon dioxide to react with at least a substantial portion of the CaO formed in the decomposition. For this purpose, a quantity of carbon dioxide equivalent, on a stoichiometric basis, to from about 75% to about 125% of the calcium present in the calcium nitrate undergoing decomposition may be conveniently employed. It is usually preferable that the carbon dioxide-containing atmosphere contain a quantity of carbon dioxide that is at least about equivalent, on a stoichiometric basis, to the calcium in the calcium nitrate being decomposed. Referring to FIG. 2, it will be seen that carbon dioxide can be introduced into decomposition zone 106 via conduit 107.

The concentration of the carbon dioxide in the atmosphere is not a critical feature of this aspect of the invention although the carbon dioxide content of the atmosphere should generally range from about 20% to 100% on the weight basis. The manner in which the carbon dioxide-containing atmosphere is formed is likewise not a critical feature of the present invention. The carbon dioxide-containing atmosphere may result from the burning of coke or coal with oxygen or an oxygen-rich atmosphere to produce carbon dioxide. The desired atmosphere may also constitute a waste product from another process, as for example, the carbon dioxide gas formed in the manufacture of ammonia.

The calcium nitrate to be decomposed should, of course, be heated to at least its decomposition temperature. The decomposition temperature of calcium nitrate is approximately 1200° F. at atmospheric pressure. While higher temperature may be employed in order to shorten the time of decomposition, care must be taken that the decomposition temperature of the by-product calcium carbonate is not exceeded. The decomposition temperature of calcium carbonate is approximately 1643° F. at atmospheric pressure. At temperatures below about 1200° F., therefore, the calcium nitrate will not be decomposed at a significant rate, while temperatures above 1643° F. will result in the undesirable decomposition of calcium carbonate. As previously indicated, some of the heat necessary to cause decomposition of calcium nitrate can conveniently be furnished by the carbon dioxide-containing atmosphere in which the decomposition takes place. Since the carbon dioxide and the CaO formed in the decomposition react in an exothermic reaction to form calcium carbonate, the heat that must be applied to the carbon dioxide-containing atmosphere is decreased by the heat furnished by this reaction. A given decomposition temperature can be maintained, therefore, with less heat input than that required for decomposition in an essentially carbon dioxide-free atmosphere. It is also possible, as heretofore indicated, to use the exothermic heat of the reaction of carbon dioxide and lime to carry out the calcium nitrate decomposition at a higher temperature with a corresponding increase in the heat input requirements that are necessary to achieve decomposition at a lower temperature in an essentially carbon dioxide-free atmosphere.

The decomposition gases drawn from the decomposition zone comprise primarily NO, $NO_2$ and $O_2$ plus any inerts or excess $CO_2$. The nitrogen oxides can thereafter be absorbed to form nitric acid in a conventional nitric acid absorber. Thus, nitric acid having a concentration of from about 52% to about 68% or higher may be formed in conventional manner. The product gas stream may also be employed for the production of higher concentration acids, including very high concentration acids, i.e. up to 98% by weight or higher. For this purpose, an excess of oxygen over that stoichiometrically required is generally needed for the production of very high concentrated nitric acid. This excess oxygen can, if necessary, be injected into the product gas stream resulting from calcium nitrate decomposition prior to the absorption of the nitrogen oxides contained therein in water, under pressure, as hereinafter set forth in greater detail.

Various techniques may be employed for contacting the calcium nitrate with the carbon dioxide-containing atmosphere during decomposition. It is within the scope of the present invention to inject the calcium nitrate into the decomposition zone in either solid or liquid form. The gas containing the desired quantity of carbon dioxide is simultaneously fed to the decomposition zone in a manner so as to contact thoroughly the calcium nitrate being decomposed with the carbon dioxide-containing gas. In one embodiment of the present invention, for instance, the carbon dioxide-containing gas may be fed countercurrent to the calcium nitrate feed so as to assure the desired thorough contacting of the calcium nitrate with the gas.

In another embodiment, the calcium nitrate is injected into the decomposition zone in the form of a mist or spray of atomized droplets. In accordance with this embodiment of the present invention, complete, external melting of the calcium nitrate solids can be accomplished continuously with any of the standard, commercially available melting furnaces commonly employed for similar purposes. Gas or oil fired units and electric units are commercially available. Injecting the calcium nitrate melt into the decomposition zone can be accomplished in a variety of ways. The melt can, for example, be put under pressure and passed through a venturi ejector in which it is mixed with the heat-carrying carbon dioxide gas so as to form a mist that is injected into the decomposition zone. Likewise, the hot carbon dioxide-containing gas may be compressed and passed through the nozzle of a venturi type ejector so as to pull the melt from the melting unit by the vacuum induced in the suction end of the venturi, thus mixing the carbon dioxide-containing gas and the calcium nitrate melt to produce a spray mist that is injected into the decomposition zone. In another embodiment, the melt can be injected directly as atomized droplets into the decomposition zone in which it is mixed with the hot, carbon dioxide-containing atmosphere to effect decomposition.

The decomposition zone contemplated by the present invention may constitute any convenient mixing chamber in which the calcium nitrate may be contacted with the carbon dioxide-containing atmosphere at decomposition temperatures. Any conventional type of calcium, for example, such as a kiln cyclone, fluid bed or modified "spray-dryer" chamber may be employed in the practice of the present invention.

In order to further illustrate the present invention, reference is made to FIG. 2, in which a particular embodiment of the present invention is illustrated. In this embodiment, calcium nitrate solids are decomposed so as to form nitrogen oxides that can be converted to nitric acid. The calcium nitrate solids being decomposed may be those formed in the nitric acid acidulation of phosphate rock to form wet process phosphoric acid. This acidulation step and the subsequent separation of calcium nitrate from the reaction mixture is not shown in the drawing. The separated calcium nitrate solids are fed to screw conveyor 101 that transports them to the melting section of an electric melter 102 having a separate melting 102a and holding section 102b. Exhaust fan 103 is provided to remove any vapors formed during the melting from melting section 102a. Pressure exerted by means of compressed air line 104 forces the calcium nitrate melt from holding section 102b to a standard disk atomizer 105 positioned at the upper end of decomposition chamber 106.

A hot carbon dioxide-containing gas obtained by the burning of coke is introduced into the lower portion of decomposition chamber 106 by means of conduit 107. Countercurrent flow of the calcium nitrate melt and the carbon dioxide-containing gas is thereby achieved in decomposition chamber 106. A portion of the calcium carbonate formed by the reaction of carbon dioxide with lime formed by decomposition of the calcium nitrate melt collects in the bottom of decomposition chamber 106 and is discharged through air lock value 108 onto screw conveyor 109 which removes it to storage and ultimate use as a by-product of the acidulation process. The remainder of the calcium carbonate formed in decomposition chamber 106 is removed as fines in the nitrogen oxide gas stream passing out of decomposition chamber 106 through conduit 110. This product gas stream passes through dust collector 111 in which the calcium carbonate fines are removed therefrom and collected. The calcium carbonate thus removed from the product gas stream is passed through air lock valve 112 onto screw conveyor 113 that discharges the collected calcium carbonate for storage with the calcium carbonate recovered from the bottom of decomposition chamber 106.

After leaving dust collector cyclone 111, in which a large portion of the calcium carbonate fines are removed therefrom, the product nitrogen oxide gas stream may be passed through conventional electrostatic Cottrell precipitators or a conventional bag house, not shown, for removal of additional fines that may still be present in the gas stream. The gases may then be treated as described above to prepare nitric acid, nitrogen tetroxide, etc.

The concentrated nitric acid thus produced may be employed, at a concentration of 75% to 85% by weight, for the digestion of additional quantities of phosphate rock. This concentrated nitric acid may also be employed, at a concentration of above about 90% by weight, preferably at above about 95% and more particularly at about 98%, to increase the nitric acid concentration of the acidulate and thus to precipitate anhydrous calcium nitrate.

In a further aspect of the invention, nitrogen dioxide withdrawn from the phosphoric acid-containing solution, together with oxygen, may be added to the acidulation mixture so as to form nitric acid in situ in the same general manner as indicated above with respect to the nitrogen oxide stream recycled directly from the calcium nitrate decomposition operation for contact with the acidulate.

In the embodiment shown in FIG. 1, at least a portion of the nitric oxide-containing gas withdrawn from decomposition chamber 1 through line 4 may be withdrawn through line 4a for contact with the acidulation mixture of product phosphoric acid and excess nitric acid withdrawn from the acidulation operation through line 26. This nitric oxide gas stream in line 4a must be quenched rapidly to below about 500° C., preferably to from about 300° C. to about 500° C., to prevent the reaction of nitric oxide with oxygen to form nitrogen dioxide. It may also be passed through a gas solids separator prior to passage through line 27 into unit 28 for contact with the mixture of nitric and phosphoric acids. Product phosphoric acid having a greatly reduced nitric acid concentration is withdrawn through line 29. By-product nitrogen dioxide is withdrawn from unit 28 through line 30. This by-product nitrogen dioxide stream may be employed for the manufacture of nitric acids by conventional techniques. It may, for example, be employed for the manufacture of very concentrated nitric acid in the same maner as indicated above with respect to the nitrogen oxide removed from chamber 1 and employed directly for concentrated nitric acid manufacture. This concentrated acid may be employed at a concentration of 75% to 85% for the acidulation of additional quantities of phosphate rock. It may also be employed, at a concentration above about 90%, to increase the nitric acid content of the acidulate. Alternately, the nitrogen dioxide stream from line 30 may be added at elevated pressure, together with oxygen, to the acidulate to form nitric acid in situ in the manner heretofore described.

In the embodiment illustrated in FIG. 2, at least a portion of the nitric oxide-containing decomposition gases removed from chamber 106 through line 110 may be withdrawn through line 110a for addition to the phosphoric acid solution containing excess nitric acid that is present in either units 131 or 132. This gas removed through line 110a must be immediately subjected to a rapid quenching operation, not shown, in order to prevent the reaction of nitric oxide formed by the decomposition of calcium nitrate with oxygen to form nitrogen dioxide.

The nitric oxide-containing gas is added to the phosphoric acid solution in either unit 131 or 132 through lines 133 and 134 respectively. Product phosphoric acid having a greatly reduced nitric acid concentration may be removed from unit 131 through line 135 and/or from unit 132 through line 136.

By-product nitrogen dioxide is removed from unit 131 through line 137 and/or from unit 132 through line 138. By-product nitrogen dioxide thus removed may be employed for the production of additional quantities of nitric acid, including the very concentrated nitric acid employed in the digestion of phosphate rock and the precipitation of anhydrous calcium nitrate from the acidulate.

By means of the present invention, essentially all of the nitrogen values contained in the calcium nitrate undergoing decomposition may be recovered and converted into nitric acid. Thus, the present invention provides a highly desirable overall process for producing phosphatic fertilizers and wet process phosphoric acid by the nitric acid acidulation of phosphate rock. In view of the well known and critical need in the industry for alternatives to the ever increasing need for sulfur, the present invention is of the greatest importance to producers of wet process phosphoric acid, phosphatic fertilizers and related agricultural and other products.

The present invention further provides a convenient and relatively inexpensive means for separating nitric acid from a mixture of nitric and phosphoric acids. In view of the increasing attention given by the phosphoric acid and phosphatic fertilizer industry to the nitric acid acidulation of phosphate rock, the present invention becomes of paramount importance. By providing an improved method for separating excess nitric acid from admixture with product phosphoric acid, the present invention enhances the nitric acid acidulation process as an attractive potential alternative to acidulation with sulfuric acid.

DESCRIPTION OF THE PREFERRED EMBODIMENTS

Example 1

A solution containing a mixture of phosphoric and nitric acids was prepared by acidulating phosphate rock with an excess of nitric acid and precipitating by-product calcium nitrate as by the acidulation and precipitation process described above. Upon removal of the by-product calcium nitrate by filtration, a filtrate solution containing approximately 14% by weight phosphoric acid and over 30% by weight nitric acid was obtained. This filtrate was evaporated to a phosphoric acid concentration of about 52% by weight. The nitric acid content of the mixture was thereby reduced to about 5% by weight.

The resulting solution was contacted counter-currently with nitric oxide gas at approximately 80° C. The nitrogen dioxide gas formed by the reaction of the nitric oxide with the nitric acid content of the solution was removed, and the resulting product solution contained 65.8% by weight phosphoric acid and only about 0.4% by weight nitric acid.

Example 2

In order to determine the effect of varying the concentration of nitric acid employed to digest phosphate rock, said change being reflected in the amount of phosphate recovered, as compared to the theoretical amount present in phosphate rock, phosphate rock about 30% $P_2O_5$- [corresponding to about 66% $Ca_3(PO_4)_2$], and 47% by weight calcium measured as CaO was digested after being crushed to a particle size passing through a 30 Tyler mesh screen. About 2.74 parts nitric acid per part calcium in the rock, calculated on the basis of CaO, was used to digest the rock. It will be appreciated that the nitric acid employed can be formed from the decomposition of calcium nitrate as indicated above.

After the phosphate rock had been digested for an hour, the calcium nitrate was precipitated in its anhydrous form from the liquid acidulate by adding 2 parts of essentially anhydrous nitric acid (97.% $HNO_3$, 2% $NO_2$, 0.6% $H_2O$) per part phosphatic rock initially acidulated. The precipitate was separated from the liquid solution by centrifugation and the resulting phosphoric acid solution was analyzed for phosphoric acid content, as $P_2O_5$. The following table illustrates the results obtained.

ACIDULATION OF PHOSPHATE ROCK

| Concentration of nitric acid employed for digestion | Temperature during digestion, °F. | $P_2O_5$ removed, based on theoretical $P_2O_5$ in rock, percent |
|---|---|---|
| 75 | 240 | 97 |
| 80 | 240 | 97 |
| 85 | 240 | 86 |

The above and other data illustrate that about 80% concentrated nitric acid will produce the highest yields of phosphoric acid.

Example 3

To demonstrate the effects of temperature, phosphate rock was acidulated, anhydrous calcium nitrate precipitated, and phosphate recovered, employing the procedure essentially as described in Example 2 with exception that 80% concentrated nitric acid was employed for digestion of the rock at the indicated temperature. Also the digestion was performed for about 2 hours. The following table shows the results obtained in recovery of phosphate material at varying temperatures.

| Temperature of acidulate in °F.: | $P_2O_5$ recovered based on theoretical $P_2O_5$ in rock (percent) |
|---|---|
| 160 | 97 |
| 180 | 95 |
| 210 | 96 |
| 240 | 97 |

Example 4

In order to illustrate the effects of rock size on the process, 80% nitric acid was employed to digest phosphate rock according to the procedure of Example 2. The temperature during digestion was 240° F. and 160° F.

EFFECT OF ROCK SIZE

| | Percent $P_2O_5$ recovered based on— | |
|---|---|---|
| | Theoretical $P_2O_5$ rock at 240° F. | Theoretical at 160° F. |
| Particles passing through Tyler mesh of— | | |
| Unground | | 38.6 |
| 6 mesh | 88.9 | 62.8 |
| 10 mesh | 84.4 | 67.0 |
| 16 mesh | 93.6 | 77.8 |
| 20 mesh | 93.9 | 94.0 |
| 30 mesh | 95.5 | 96.6 |
| 60 mesh | | 97.2 |

From the results it is seen that crushing rock to a size passing through 30 Tyler mesh screen produces a uniquely high recovery of phosphate value.

Example 5

In order to further demonstrate the effectiveness of this process, four batch experiments were performed. In each experiment, one hundred parts of the phosphate rock employed in Example 2 were digested with 80 weight percent concentrated nitric acid at a rate of 2.70 parts $HNO_3$ per part calcium calculated as CaO. The 80% nitric acid adds about 33 parts of free water to the system. Otherwise the procedure of Example 2 was followed essentially as described.

The following table illustrates the relationship of anhydrous calcium nitrate removed from solution to the weight percent of free water in solution after precipitation.

In each experiment, increasing amounts of the anhydrous nitric acid were added to the acidulate to precipitate the anhydrous calcium nitrate.

| Experiments | 1 | 2 | 3 | 4 |
|---|---|---|---|---|
| Part of $HNO_3$ added per part $Ca(NO_3)_2$ | 0.38 | 0.77 | 1.15 | 1.54 |
| Parts of— | | | | |
| Nitric acid added | 52.5 | 105.0 | 157.5 | 210.0 |
| Acidulate before addition of nitric acid | 261.0 | 261.0 | 261.0 | 261.0 |
| Total parts | 313.5 | 366.0 | 418.5 | 471.0 |
| Parts of— | | | | |
| Anhydrous calcium nitrate precipitated | 104.6 | 123.9 | 129.4 | 135.6 |
| Solution after precipitation of nitric acid | 208.9 | 242.1 | 289.1 | 335.4 |
| Percentage of— | | | | |
| Free water in supernatant solution | 15.9 | 13.7 | 11.5 | 9.9 |
| Original calcium removed from solution | 76 | 90 | 94 | 98.5 |

The results of this experiment demonstrate that in removing most of the anhydrous calcium nitrate from a phosphate rock acidulate, by increasing the quantity of nitric acid in the system, sufficient nitric acid must be present in the acidulate to reduce the percentage of free water in solution to less than about 14 weight percent and preferably below 10 weight percent. When such calcium removal is achieved, a phosphoric acid solution (or phosphatic fertilizer concentrate) is obtained which can be converted to an essentially completely water soluble fertilizer, e.g. by ammoniation. The calcium (as CaO) to phosphate $P_2O_5$ ratio in the system wherein 98.5% CaO has been removed, is about 1 to 17. The supernatant is essentially concentrated nitric and phosphoric acids. On evaporation of nitric acid, essentially pure phosphoric acid is produced.

Example 6

To demonstrate the precipitation of anhydrous calcium nitrate by forming nitric acid in situ, a 10% excess of 80% by weight nitric acid was employed to digest the phosphate rock of Example 2. One hundred parts of the resulting acidulate, which contained 13.02% phosphoric acid (as $P_2O_5$) and 19.49% calcium nitrate (as CaO), were sealed in an autoclave. The autoclave temperature was adjusted to about 160° F. Next, 39 parts of nitrogen dioxide, as from the decomposition of calcium nitrate were added and thereafter oxygen gas was introduced to furnish a pressure of 100 pounds per square inch gauge. Additional oxygen was added as needed to maintain this pressure.

The precipitation reaction was complete in 15 minutes and oxygen pressure was maintained for a further 15 minutes, though no pressure drop was observed which would indicate further reaction. After depressuring the system and filtering the anhydrous calcium nitrate cake, the liquid phase showed, on analysis, 16.98% phosphoric acid (as $P_2O_5$) and only 1.18% calcium nitrate (as CaO), or a ratio of 14 to 1. The low ratio of calcium in the phosphatic concentrate makes it especially suitable for processing by neutralization to a highly water soluble mixed fertilizer.

Example 7

Employing the procedure of Example 6, 100 parts of nitric acid acidulate containing 13% ($P_2O_5$) and 17.58% (as CaO) were reacted with 129 parts of nitrogen dioxide and oxygen. The filtrate obtained analyzed 9.61% ($P_2O_5$) and 0.4% (CaO) a ratio of 24 to 1. The production of $P_2O_5$ was 98.8% of theoretical.

The higher degree (over 97% calcium removed) of purity of the filtrate, allows further processing of the solution to a mixed fertilizer of higher water solubility.

The above examples illustrate various specific embodiments of the process. When the above examples are repeated employing the conditions, proportions and other variations discussed herein, similar results are obtained. It is to be understood that modifications can be made. For example, the anhydrous calcium nitrate can be precipitated from the acidulate employing a combination of both pre-formed and in situ-formed nitric acid. Still further, the wash solution resulting from washing the filtered anhydrous calcium nitrate can be employed in the process. For example, at the designated concentrations, it, along with make up acid, can be used as digestion acid. The wash solution can also be employed in the precipitation step either by further concentrating to a higher nitric acid content or by combining with make-up nitric acid. It will also be evident that the wash solution can be reacted with nitrogen oxides and oxygen to produce additional nitric acid in situ.

The anhydrous calcium nitrate by-product can be used for various known purposes or it can be decomposed at elevated temperatures, producing nitrogen oxides and oxygen. The nitrogen oxides and oxygen can then be reacted with water to form nitric acid, either separately or in situ; for example, in the precipitation reaction mix. Still further, any nitric acid that is recovered from the phosphoric acid solution or elsewhere in the processing can, of course, be used in either forming the digestion acid or the precipitation acid. It will also be evident that the process of this invention can be conducted either by batch or continuous techniques employing single or multiple reactors for the digestion step and/or the precipitation step.

The phosphoric acid solution resulting from separation of the anhydrous calcium nitrate can be employed for many uses. It is particularly useful for neutralization reactions with bases, especially ammonia and phosphate rock, to produce fertilizer mixes. Nitric acid contained in the phosphoric acid solution can be removed to any desired extent in order to adjust the final composition of the fertilizer mix. In all cases, however, the resulting fertilizer mix is at least 90 percent soluble in water and most generally at least 95 percent soluble in water. Numerous fertilizer mixes have been prepared employing the phosphoric acid solution obtained by the present process. By way of example, fertilizer mixes resulting from ammoniation typically are formed with at least 2:1 and more generally 3:1 phosphoric acid anhydride, i.e. $P_2O_5$, to nitrogen ratios having the aforementioned water solubility characteristics.

Still further, mixed fertilizers can be obtained readily from the phosphoric acid solution resulting from practicing the process of this invention without removal of any of the nitric acid by reacting the phosphoric acid solution directly with metal salts such as alkali metal halides, and, preferably, potassium chloride. Usually the alkali metal halide is employed in an amount of at least 2 moles per mole of phosphoric acid contained in the phosphoric acid solution. During the reaction of the alkali halide for example, potassium chloride, with the phosphoric acid solution, chlorine and nitrogen oxides are produced which can be readily separated and reused as discussed above. Generally, any unreacted nitric acid is removed from the alkali halide and phosphoric acid solution reaction mixture and the residue is preferably heated at a temperature of about 740° C. for about thirty minutes. Again the resulting mixed fertilizer is essentially completely soluble in water and has an exceptionally high plant food analysis. A particular feature among others, in employing the phosphoric acids solution produced by this invention for reaction with alkali halide as described herein is that highly toxic and corrosive nitrosyl halide normally produced by prior art techniques are minimized.

Therefore, I claim:

1. A process for producing phosphoric acid which comprises:
   (a) treating phosphate rock with nitric acid to produce an acidulate comprising nitric acid, phosphoric acid and calcium nitrate,
   (b) removing calcium nitrate from the acidulate, leaving a solution comprising phosphoric and nitric acid,
   (c) contacting the solution of nitric acid and phosphoric acid with a gaseous mixture of nitric oxide and oxygen, said gaseous mixture being at a temperature when brought into contact with said solution which substantially precludes the presence of nitrogen dioxide in the gaseous mixture, the nitric acid and nitric oxide reacting to form nitrogen dioxide gas and water, and recovering a phosphoric acid solution characterized by a reduced nitrate content.

2. A process according to claim 1 in which the phosphate rock is treated with 75% to 85% by weight concentrated nitric acid.

3. A process according to claim 1 in which the calcium nitrate is removed from the acidulate by raising the concentration of nitric acid therein until calcium nitrate precipitates therefrom and separating said calcium nitrate from the supernatant solution.

4. A process according to claim 1 in which the calcium nitrate is removed from the acidulate by raising the nitric acid concentration of the acidulate until the supernatant nitric acid-phosphoric acid solution contains less than about 14% by weight of water.

5. A process according to claim 4 in which the concentration of nitric acid is increased by adding nitric acid having a concentration of at least 90% by weight.

6. A process according to claim 4 in which the nitric acid concentration of the acidulate is increased by introducing nitrogen dioxide and oxygen to form nitric acid therein.

7. A process according to claim 1 in which the calcium nitrate separated in step (b) is decomposed to provide at least part of the nitric oxide employed in step (c).

8. A process according to claim 7 in which the calcium nitrate separated in step (b) is decomposed in a vertically oriented fluidized bed.

9. A process according to claim 7 in which the calcium nitrate is decomposed in the presence of a nitrogen oxide containing atmosphere.

10. A process according to claim 9 in which the calcium nitrate is decomposed in a fluidized bed decomposition zone and a portion of the nitrogen oxide decomposition gases are recycled upwardly through said bed for fluidization thereof.

11. A process according to claim 7 in which the calcium nitrate is decomposed in the presence of carbon dioxide.

12. A process according to claim 7 in which at least part of the calcium nitrate decomposition gases are absorbed, together with oxygen, in water for production of additional nitric acid.

13. A process according to claim 7 in which a portion of the nitrogen oxide decomposition gases are recycled, together with oxygen, into step (a) to form additional nitric acid.

14. A process according to claim 1 in which the nitrogen dioxide gas formed in step (c) is recycled for production of additional nitric acid.

15. A process according to claim 1 in which the nitric acid concentration of the solution in step (c) is reduced to a level no greater than about 5% by weight prior to contact with nitric oxide.

16. A process according to claim 1 in which the nitric oxide employed in step (c) is obtained by oxidizing ammonia.

17. A process for producing phosphoric acid which comprises:
   (a) treating phosphate rock with nitric acid to produce an acidulate comprising nitric acid, phosphoric acid and calcium nitrate,
   (b) thereafter raising the nitric acid concentration of the acidulate until calcium nitrate precipitates,
   (c) separating and decomposing calcium nitrate, and
   (d) contacting the solution containing nitric and phosphoric acid with a gaseous mixture of nitric oxide and oxygen, said gaseous mixture being at a temperature when brought into contact with said solution which substantially precludes the presence of nitrogen dioxide in the gaseous mixture, at least a portion of said gaseous mixture being obtained from step (c), the nitric acid and nitric oxide reacting to form nitrogen dioxide gas and water, and recovering a phosphoric acid solution characterized by a reduced nitrate content.

18. A process according to claim 17 in which the nitrogen oxide decomposition gases obtained in step (c) are recycled for use in steps (a), (b), (d), or combination thereof.

19. A process according to claim 18 in which nitrogen dioxide is recovered for production of nitric acid.

20. A process according to claim 19 in which nitric oxide is recovered and recycled in step (d), the nitric oxide and nitric acid to form nitrogen dioxide gas and water.

21. A process according to claim 20 in which the nitrogen dioxide formed is recovered and recycled for production of additional nitric acid.

22. A process according to claim 17 in which the calcium nitrate is precipitated from the acidulate solution by raising the nitric acid content thereof until the acidulate solution contains less than about 14% by weight water.

23. A process according to claim 22 in which the nitric acid content of the acidulate is raised by introducing therein nitrogen oxides obtained by decomposing calcium nitrate.

24. A process according to claim 23 in which the nitrogen oxides are introduced in a gas stream comprising nitrogen dioxide and oxygen.

25. A process according to claim 22 in which the nitric acid content of the acidulate is raised by the addition of nitric acid having a concentration of at least 90% by weight.

26. A process according to claim 17 in which the phosphate rock is treated in step (a) with 75% to 85% concentrated nitric acid.

27. A process according to claim 19 in which the nitrogen dioxide is absorbed in water together with oxygen for production of nitric acid for use in steps (a), (b), or both.

28. A process according to claim 19 in which the nitrogen dioxide is recycled for use in steps (a), (b), or both, to produce nitric acid therein.

29. A process according to claim 17 in which
   (a) the phosphate rock is treated with 75% to 85% by weight concentrated nitric acid,
   (b) the nitric acid content of the acidulate solution is increased until the water content of the solution is below about 14% by weight,
   (c) the calcium nitrate precipitated and decomposed is substantially anhydrous,
   (d) the nitric acid content of the acidulate solution is reduced to no more than about 5% by weight prior to treatment with nitric oxide, and (e) the decomposition gases from step (c) are recycled for use in steps (a), (b), (d) or combination thereof.

References Cited

UNITED STATES PATENTS

| | | | |
|---|---|---|---|
| 3,560,149 | 2/1971 | Markey et al. | 23—165 |
| 3,136,602 | 6/1964 | Berger | 23—161 X |
| 2,988,425 | 6/1961 | Sutherland et al. | 23—161 X |
| 3,563,703 | 2/1971 | Camp | 23—165 |

OSCAR R. VERTIZ, Primary Examiner

G. A. HELLER, Assistant Examiner

U.S. Cl. X.R.

423—167, 400, 405